Patented Oct. 6, 1925.

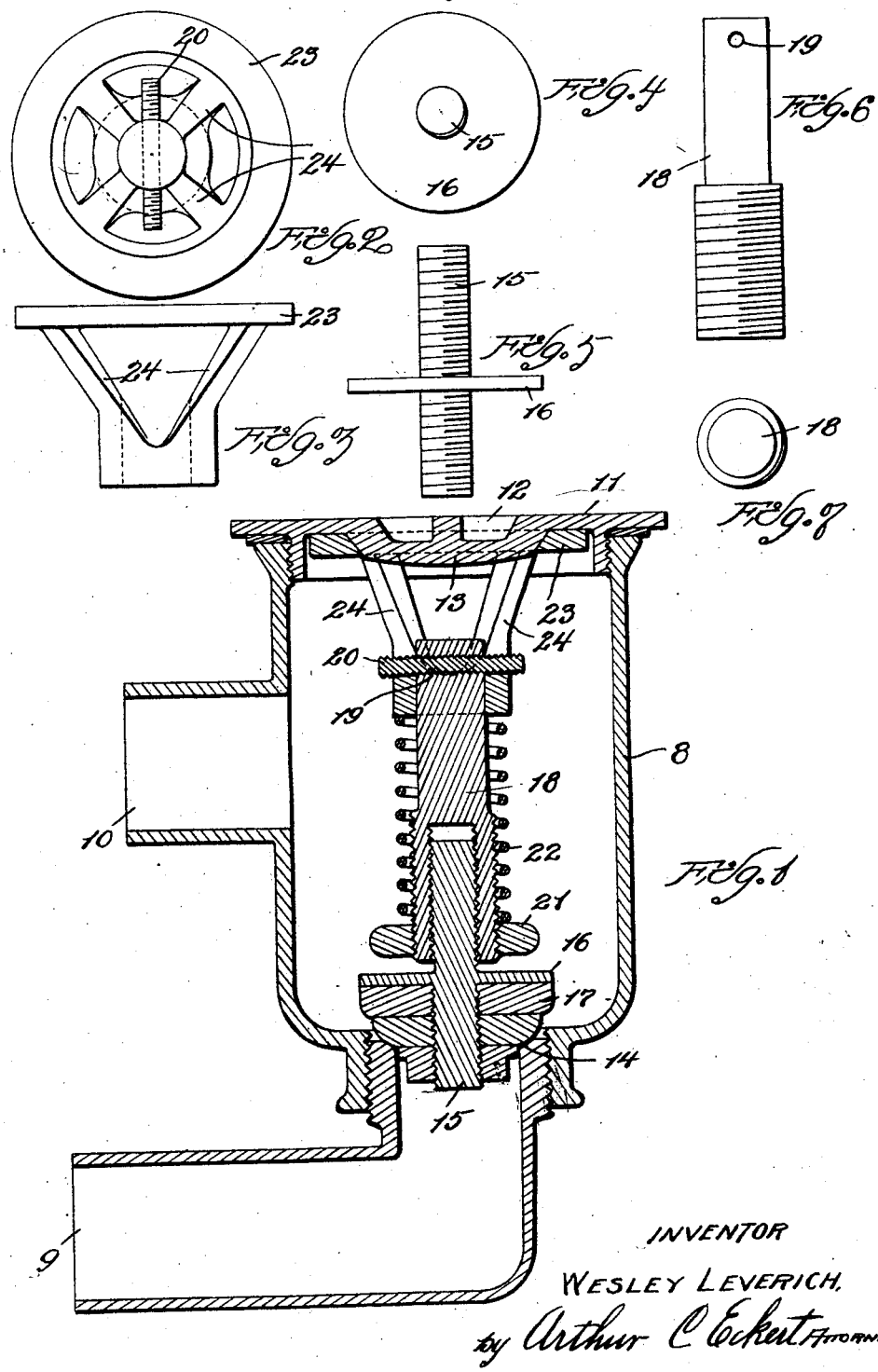

1,555,996

UNITED STATES PATENT OFFICE.

WESLEY LEVERICH, OF FERGUSON, MISSOURI, ASSIGNOR OF ONE-HALF TO JOHN COLEMAN, OF FERGUSON, MISSOURI.

TEST PLUG.

Application filed September 11, 1924. Serial No. 737,095.

*To all whom it may concern:*

Be it known that WESLEY LEVERICH, a citizen of the United States of America, residing at Ferguson, in the county of St. Louis and State of Missouri, has invented certain new and useful Improvements in Test Plugs, of which the following is a specification.

The object of my device is to devise a test plug for water traps in plumbing systems. A more particular object is to devise a test plug to be used for traps in connection with bath tubs that have an over-flow opening. The plumbing system, after it is installed must be tested by having it subjected to water pressure. In doing this it becomes necessary to close or plug up all the openings. Most of the openings may be closed by closing a faucet, or in the case of a bath tub with an overflow, a special device is necessary to seal the bath tub connection from the remainder of the system. My device performs this sealing function. This test plug is made of few and simple parts that can be easily assembled and that lend themselves readily to multiple production. It may be used with the standard trap and is self-centered, and permits of adjustments to accommodate the size of the trap.

With these and other objects in view, my invention has relation to certain novel features of construction and arrangement of parts as will be hereinafter more fully described, pointed out in the claims, and illustrated in the drawings in which, Fig. 1 is a sectional elevation of a standard trap with the valve removed and my test plug in position therein.

Fig. 2 is a plan view of my device and,

Fig. 3 is an elevation of the cage and,

Fig. 4 is a plan view of the plug stem and,

Fig. 5 is an elevation of the plug stem and,

Fig. 6 is an elevation of the spring sleeve and,

Fig. 7 is a plan view of the spring sleeve.

Numeral 8 designates the trap having the fluid openings 9 and 10 and the cover plate 11, which is in threaded engagement with the top of the trap 8. The cover plate 11 has the finger hole 12 formed in the center of its upper surface and the integral fragmental spherical projection 13 formed on its inner surface centrally located. Numeral 14 designates the trap seat. The description thus far is that of the conventional trap, which is usually located in the floor with the cover plate 11 flush with the upper surface of the floor, adjacent the bath tub.

Numeral 15 designates the plug stem having the annular projection 16 formed integrally therewith intermediate its length. The plug stem 15 is threaded above and below the annular projection 16. Numeral 17 designates a plug usually made of rubber or other similar resilient material. This plug 17 has a hole formed in its center of such size to permit its being positioned over the plug stem 15 immediately beneath the annular projection 16. The outside diameter of the portion of the plug 17 in contact with the annular projection 16 is the same as that of the annular projection 16. Formed integrally with this portion of the annular projection 16 is a portion of lesser diameter, as shown in the lower portion of the plug 17 in Fig. 1. The purpose of having the plug made with two diameters is to enable it to fit trap seats 14 of different size. When the trap-seat is small, the lower or smaller portion of the plug 17 is seated, and when the trap seat 14 is large, the larger portion of the plug 17 is seated. Numeral 18 designates the spring sleeve, which is internally threaded so that it may be placed in threaded engagement with the upper portion of the plug stem 15. This spring sleeve 18 is also exterially threaded for a portion of its length beginning at the bottom. The diametral hole 19 is formed near the upper end of the spring sleeve 18 to engage in threaded engagement the pin 20. Numeral 21 designates a spring support which is circular in shape and has a threaded hole in its center permitting it to be screwed on to the external threads of the spring sleeve 18. Numeral 22 designates a coiled spring which is positioned over the spring sleeve 18 and supported by the spring support 21.

Numeral 23 designates a cage having its lower portion slightly larger in diameter than the diameter of the spring sleeve 18, and having its upper portion substantially larger. The lower portion has a hole formed in it which permits it to be positioned over the top of the spring sleeve 18, above the coiled spring 22. The upper portion has a hole cut in it of such diameter that it may accommodate the fragmental spherical projection 13. The upper and lower portions are connected together by the flaring arms 24. In order to secure the cage 23 to the spring sleeve 18 after the cage 23 is slipped over the upper end of the spring sleeve 18, above the coiled spring 22, the pin 20 is passed between two of the arms 24 and through the diametral hole 19.

When my device thus far described is positioned in the trap 8 so that the plug 17 is seated in the trap seat 14, the cover plate 11 is screwed down on the trap 8, thereby compressing the coiled spring 22 against the spring support 21 and the plug stem 15 downwardly, and hence the plug 17 against the seat 14.

In the conventional trap the cover plate 11 need be screwed down only about a quarter of an inch to completely seat the plug 17 in the trap seat 14. It will be seen that my device is centered in the trap because the plug 17 is in engagement with the trap seat 14 and the upper portion of the cage 23 is secured around the fragmental spherical projection 13.

Obviously the force that is exerted on the plug 17 to seat it in the trap seat 14 depends on four things. First, the spring of the coiled spring 22; secondly, the position of the spring support 21; thirdly, the position of the spring sleeve 18 relative the stem of the plug stem 15; and fourthly, on the distance that the cover plate 11 is screwed down into the trap 8. Obviously all four of these elements are adjustable. The spring may be made of any desirable strength, the spring support 21 may be screwed upwardly against the coiled spring 22, compressing the spring against the lower portion of the cage 23, and the spring may be further compressed or loosened by screwing the spring sleeve 18 upwardly or downwardly on the plug stem 15. These adjustments are necessary to compensate for the difference in heights of the traps 8. Obviously the cover plate 11 may have a range of adjustability depending upon the number and pitch of the threads which hold it in threaded engagement with the trap 8.

The traps 8 vary but slightly in size so that when my device is once adjusted for ordinary work, in order to use it it need only be placed in the trap and the cover plate screwed down.

What I claim and mean to secure by Letters Patent is,

1. A test plug comprising a plug and a plug stem, said plug secured to said plug stem, a spring sleeve, said spring sleeve secured to said plug stem, a coiled spring and a cage, said cage secured to said spring sleeve, said coiled spring secured around said spring sleeve between said cage and a spring support positioned on said spring sleeve.

2. A test plug comprising a plug, a plug stem, said plug stem secured to said plug, a spring sleeve in threaded engagement with said plug stem, a spring support in threaded engagement with said spring sleeve, a coiled spring positioned over said spring sleeve, a cage secured to said spring sleeve in contact with the upper surface of said spring.

In testimony whereof I affix my signature.

WESLEY LEVERICH.